(12) United States Patent
Moore et al.

(10) Patent No.: US 7,079,482 B2
(45) Date of Patent: Jul. 18, 2006

(54) METHOD AND SYSTEM FOR TEST HEAD TESTING OF CONNECTIONS OF A SONET ELEMENT

(75) Inventors: Francois G. Moore, McKinney, TX (US); Carl D. Reeves, Lewisville, TX (US); William D. Sandor, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 963 days.

(21) Appl. No.: 09/961,106

(22) Filed: Sep. 21, 2001

(65) Prior Publication Data

US 2003/0058801 A1 Mar. 27, 2003

(51) Int. Cl.
*H04J 1/16* (2006.01)
*H04J 3/14* (2006.01)

(52) U.S. Cl. .................. 370/222; 370/225; 370/248; 370/249; 370/251

(58) Field of Classification Search ........ 370/222–223, 370/225–247, 248–250, 251
See application file for complete search history.

(56) References Cited

U.S. PATENT DOCUMENTS

| 6,370,154 | B1* | 4/2002 | Wickham ................... 370/463 |
| 6,847,702 | B1* | 1/2005 | Czerwiec et al. ........ 379/29.01 |
| 2002/0120853 | A1* | 8/2002 | Tyree ......................... 713/188 |
| 2002/0141344 | A1* | 10/2002 | Chidambaran et al. ..... 370/236 |

OTHER PUBLICATIONS

Remote Access and Test System React 2001™ brochure, *Spirent™ Communications*, 2001, 2 pages.
"Network Maintenance: Access and Testing Messages (A Module of OTGR, FR-439)" Telcordia Technologies Generic Requirements GR-834-CORE, Issue 3, OTGR Section 12.4, *Telcordia™ Technologies*, Jun., 2000., 524 pages.

* cited by examiner

*Primary Examiner*—Dang Ton
*Assistant Examiner*—Inder Pal Mehra
(74) *Attorney, Agent, or Firm*—Baker Botts L.L.P.

(57) ABSTRACT

A method of configuring a SONET network element to support a test head test session comprises dedicating an otherwise assignable output port of a SONET network element as a test access port, receiving a request to connect a connection switched by a switch fabric of the SONET network element to the test access port, determining whether the request is associated with a test head; and, if the request is associated with the test head, provisioning the switch fabric to connect the connection to the test access port.

17 Claims, 5 Drawing Sheets

METHOD AND SYSTEM FOR TEST HEAD TESTING OF CONNECTIONS OF A SONET ELEMENT

TECHNICAL FIELD OF THE INVENTION

This invention relates in general to telecommunications networks, and more particularly to a method and system for test head testing of connections of a synchronous optical network (SONET) element.

BACKGROUND OF THE INVENTION

Telecommunications systems include customer premise equipment (CPE), local loops connecting each customer premises to a central office or other node, the nodes providing switching and signaling for the system, and internode trunks connecting the various nodes. The customer premise equipment (CPE) includes telephones, modems for communicating data over phone lines, and computer and other devices that can directly communicate video, audio, and other data over a data link. The network nodes include traditional circuit-switched nodes that have transmission paths dedicated to specific users for the duration of a call and employ continuous, fixed-bandwidth transmission and packet-switch nodes that allow dynamic bandwidths, dependent on the application. The transmission media between nodes may be wireline or wireless.

One type of wireline transmission media is optical fiber that has a thin strand of glass that is designed to carry information using pulses of light. Separate optical fibers are bundled together and encased in an outer sheath to form fiber cables. Optical fiber provides users with higher reliability, superior performance, and greater flexibility than traditional copper-based systems.

Optical transmission facilities are installed in the form of synchronous optical network (SONET) rings. SONET defines a line rate hierarchy and frame format as described by the American National Standards Institute (ANSI) T1.105 and T1.106 specifications. Typically, nodes on a SONET ring provide add-drop multiplexing for traffic on the ring and may provide limited switching functionality. SONET rings are typically bi-directional to provide redundant transmission paths and protection in case of a line or node failure.

Typically, SONET network elements are connected to "digital cross-connects" (DCSs) that provide switching functionality for traffic on the ring and for traffic between networks. DCSs, which are typically expensive, also provide line testing capability through fixed test ports that are accessible by a test head. Test heads can passively monitor connections, or use "split" lines and intrusively test and troubleshoot a circuit by both transmitting signals to the circuit and monitoring signals received from it.

SUMMARY OF THE INVENTION

The present invention provides a method and system for test head testing of connections of a SONET element that substantially eliminate or reduce disadvantages and problems associated with earlier systems.

A method of configuring a SONET network element to support a test head test session comprises dedicating an otherwise assignable output port of a SONET network element as a test access port, receiving a request to connect a connection switched by a switch fabric of the SONET network element to the test access port, determining whether the request is associated with a test head; and, if the request is associated with the test head, provisioning the switch fabric to connect the connection to the test access port.

Important technical advantages of certain embodiments of the present invention include an improved method and system for test head testing of connections of a SONET element. In particular, the present invention provides a SONET element that directly supports line testing in connection with a test head.

A second technical advantage of the present invention is an improved SONET element. In particular, the invention provides a SONET element with a larger switch fabric and configured to provide test access ports.

A third technical advantage of the present invention is an improved network topology. DCSs may be eliminated for many applications. Thus, the overall cost of a network is reduced.

A fourth technical advantage of the present invention is that it provides dedication of test access ports via programmable logic and connections to test heads via those ports to be implemented via Transaction Language 1 (TL-1) commands. TL-1 is a widely used telecommunications management protocol.

Certain embodiments may possess none, one, some, or all of these technical features and advantages and/or additional technical features and advantages.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

Figure 1:
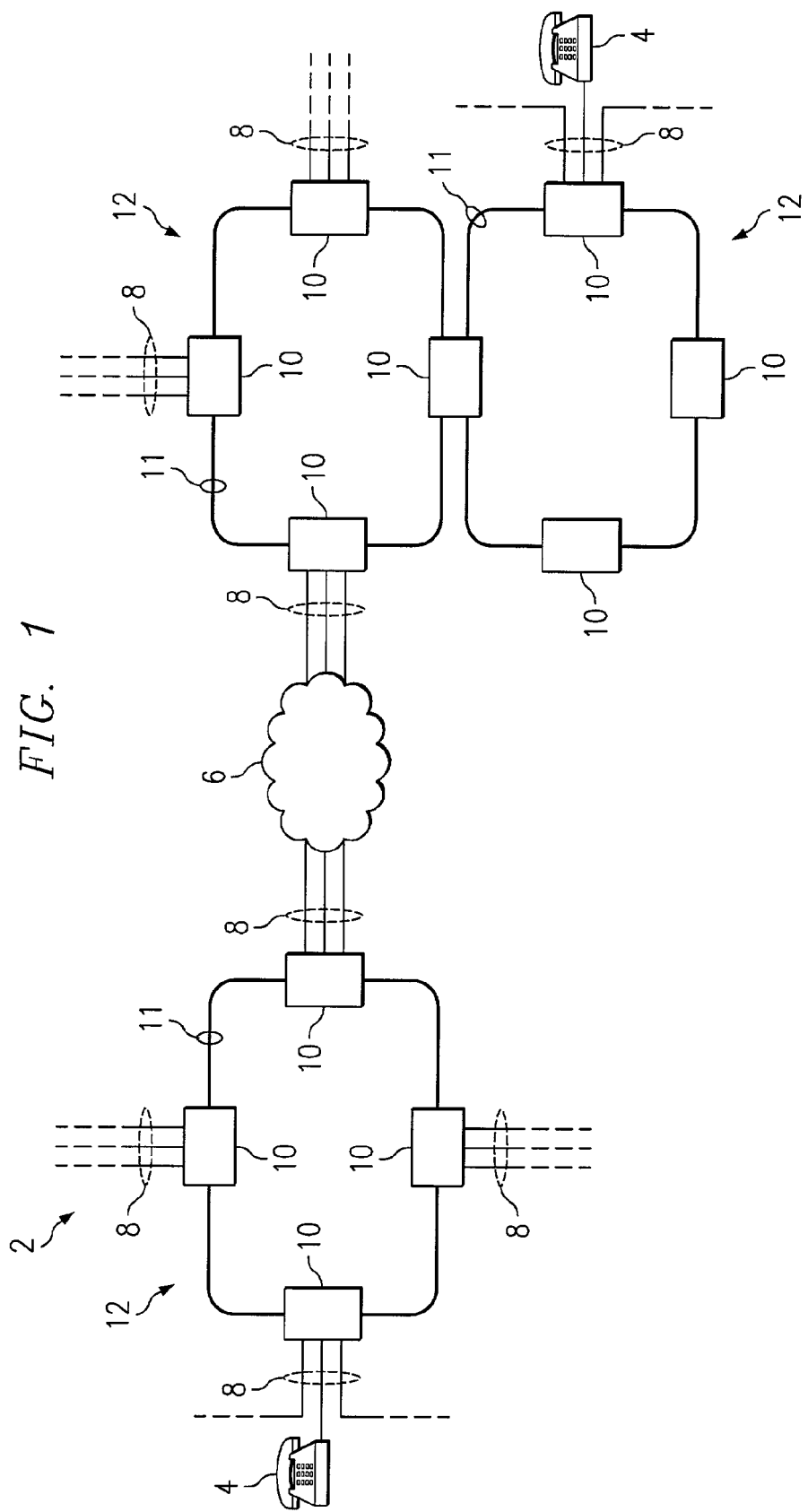
FIG. 1 illustrates a telecommunications system including synchronous optical network (SONET) rings and network elements in accordance with one embodiment of the present invention.

FIG. 1 illustrates a telecommunications system including synchronous optical network (SONET) rings and network elements in accordance with one embodiment of the present invention. The telecommunications system 2 transmits voice, video, other suitable types of data, and/or a combination of different types of data between remote locations. In the embodiment of FIG. 1, as described in more detail below, traffic is transmitted in a SONET format. Traffic may be otherwise transmitted in other suitable formats.

Referring to FIG. 1, the telecommunications system 2 includes a plurality of SONET rings 12 having a plurality of SONET network elements 10 capable of communicating traffic in the telecommunications system 2.

The SONET rings comprise optical transmission lines 11 that provide a physical interface between the SONET network elements 10. Each physical interface is defined by the bandwidth of the connecting optical transmission line 11. For the SONET ring 12, the optical transmission lines 11 each comprise optical fiber capable of transporting traffic between two SONET network elements 10. The optical fiber may be an OC-3 line, an OC-12 line, or the like. For protection switching, redundant transmission lines may be provided to transmit traffic in opposite directions around the SONET ring 12.

On the SONET ring 12, traffic is serially transmitted within SONET frames. The SONET network elements 10 each align received frames for data extraction. Data extracted from a frame is converted to parallel data and synchronized to the internal clock of the node for local processing and/or retransmission.

The SONET network elements 10 may also be connected via connections 8 to a network 6 or to other local or wide area networks which may may comprise a plurality of interconnected circuits, connections, loops, nodes, and elements in SONET and other protocols or formats, including digital and/or analog signals. The connectivity of the telecommunications system 2 is such that an on-demand connection may be made between telecommunications devices 4 or other devices elsewhere within the telecommunications system 2, allowing transmisssion of voice and data traffic between the devices.

Figure 2:
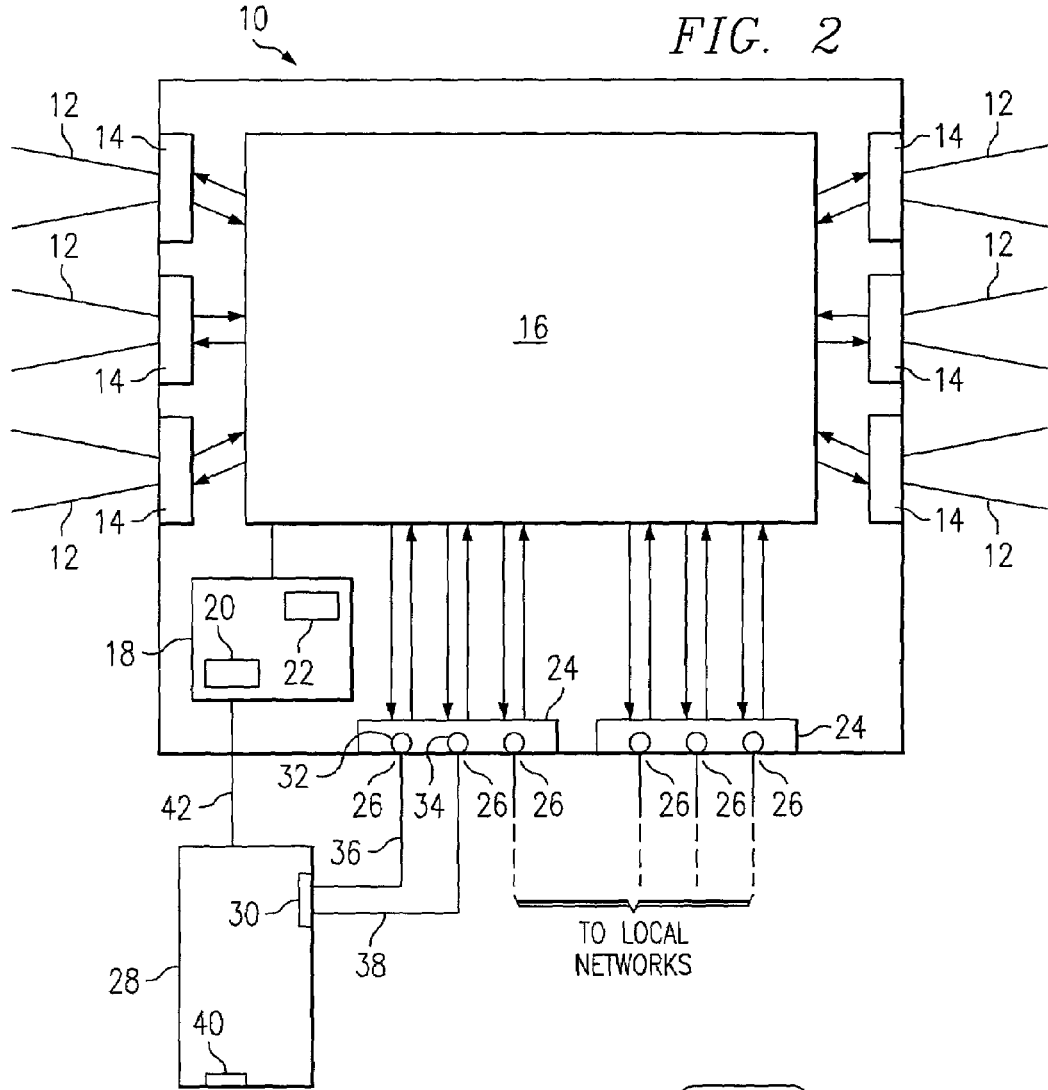
FIG. 2 illustrates a SONET element of the telecommunications system of FIG. 1 in accordance with one embodiment of the present invention.

FIG. 2 illustrates a SONET network element 10 of a telecommunications network in accordance with one embodiment of the present invention.

Referring to FIG. 2, the SONET network element 10 may be capable of handling SONET as well as other types of traffic. The SONET network element 10 is connected to a plurality of SONET loops 12 via SONET line cards 14. The SONET network element 10 also may comprise one or more digital signal (DS) line cards 24. DS line cards 24 comprise a plurality of ports 26 that may be connected to local, long distance, or other suitable telecommunications networks, or to test head or other network devices. SONET line cards 14 and DS line cards 24 are communicably connected to SONET switch fabric 16. SONET switch fabric 16 receives traffic from the line cards, and connects the traffic to one or more line cards for retransmission.

The SONET network element 10 also may comprise a central processing unit (CPU) 18 including a switch fabric manager 20 and an interface agent 22. Switch fabric manager 20 monitors and controls the status of the SONET switch fabric 16 and its connections. The switch fabric manager 20 comprises logic encoded in or on a computer-readable media for implementing the functionality of the system. The logic may comprise software stored on the computer-readable medium, or hardware encoded in a processor card, application specific integrated circuits (ASIC), field programmable gate arrays (FPGA) and the like. The software includes programs, modules, functions, database tables and entries, data, routines, data storage, and other suitable elements. The interface agent 22 receives, parses, and transmits to the switch fabric manager 20 requests from a user or another authorized entity to initiate, control, and terminate connections between one or more line cards 14 and 24 through the switch fabric 16.

A test head 28 comprises a module or modules comprising hardware and/or software enabling the test head to conduct performance monitoring and/or direct testing of a DS connection within a SONET hierarchy or other connection within the network. The test head 28 in the illustrated embodiment may be a single unit comprising all necessary hardware or software modules, and may be able to send commands to the network element 10 via connection 42. In other embodiments, the test head may comprise software and hardware modules in a geographically distributed architecture. The test head 28 may comprise a user interface 40 allowing for a user to input operational commands to the test head, receive the results of testing, and to perform other necessary communications with the test head 28. A commercially available test head, including but not limited to, for example, the REACT 2001 test head manufactured by Spirent Communications of Rockville, Inc., Rockville, Md., USA, may be suitable.

A network element interface 30 of the test head 28 may be connected to the network element 10 via one or more of the available plurality of ports 26 on a DS line card 24. In the illustrated embodiment, two of the available plurality of ports 26 are dedicated as test access ports 32 and 34. In one embodiment, the dedication of the available plurality of ports as test access ports is through programmable logic. The programmable logic may exist as software residing within the switch fabric manager 20 of the SONET network element 10. Test access ports 32 and 34 and the network element interface 30 are connected via connections 36 and 38. The switch fabric manager 20 may be programmed to refuse an ordinary customer connection request relating to test access ports 32 and 34, and to only follow, or grant, commands relating to test access ports 32 and 34 if the commands are associated with a test head. In this context, commands associated with a test head may comprise a command to create a connection between the switch fabric 16 and a test access port, a command to modify the mode of an existing connection, or a command to terminate a connection between the switch fabric 16 and a test access port. Test access connections may also be terminated by the switch fabric manager if there is a problem with the hardware, software, or connections such that testing does not proceed appropriately. For example, the switch fabric manager may be programmed to terminate the connection if a certain amount of time passes without communication from the test head or from the user.

If a user desires to issue a command associated with a test head, he or she may do so using user interface software residing on the user's desktop computer or other suitable device or devices communicably connected to SONET network element 10 via the interface agent 22.

Commands to the interface agent 22 may be in the form of Transaction Language 1 (TL-1) commands or another suitable language. TL-1 is a widely used telecommunications management protocol defined by Bellcore. TL-1 specification documents are available from Telcordia Technologies, Inc., Piscataway, N.J., USA. A typical TL-1 command may have the following format:

COMMAND NAME:TID:AID:CTAG:[PARMS]:
 [KEYWORD=VALUE]:

The square brackets denote that many PARMS and KEYWORDS can be specified within the same command. "TID"

uniquely identifies the target SONET network element 10 where the test access operation should proceed. "AID" represents the access point identifier within this SONET network element and may correspond to a particular DS port on a specific DS line card 24 within the SONET network element 10. "CTAG" represents a command identifier. TL-1 commands may include keywords "TAP" (for "test access port") and "MD" (for "mode") and associated values. As described further below in reference to FIG. 3, one or more of an otherwise assignable output port of a SONET network element may be dedicated as test access ports. Each individual dedicated test access port may have assigned to it a unique numeric keyword value. Modes of testing including monitoring and intrusive testing may be assigned keyword values such as "MONE" and "SPLTE," respectively. The switch fabric manager may be programmed to recognize commands containing appropriate values corresponding to these TL-1 keywords as requests associated with a test head and related to a connection via a test access port, and to process them accordingly. Thus, a TL-1 command named "CONN-TAC" may be created to establish a "monitoring" testing session on SONET network element NODE10 for DS port 14-1 using a dedicated test access port with a keyword value of 101. Such a command may have the following format:

COMMAND NAME:TID:AID:CTAG::<TAP>:
<MD> and read as follows:

CONN-TAC:NODE10:14-1:CTAG::101:MONE

In a particular embodiment, two of the otherwise assignable output ports of the SONET network element may be dedicated as test access ports and given three-digit TAP keyword values such as 101 and 102.

The user may also have a communication link with the test head 28, via the user interface 40, in order to receive test results and otherwise direct the function of the test head.

Figure 3:
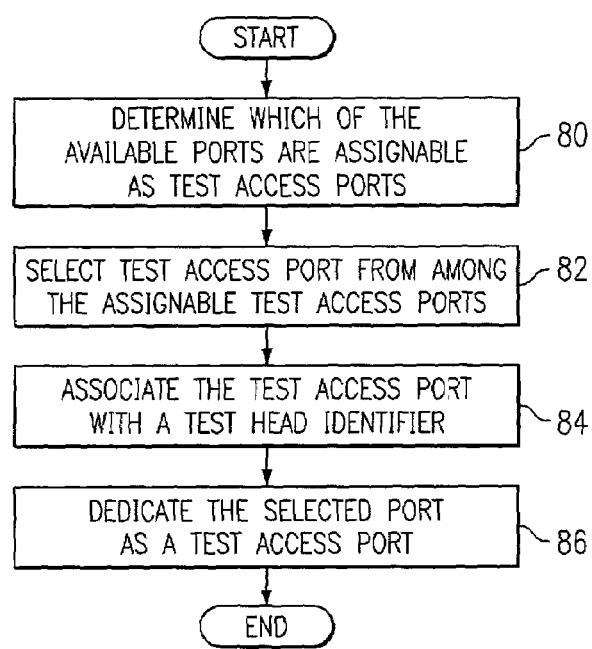
FIG. 3 is a flow diagram illustrating a method of dedicating test access ports (TAPs) from otherwise assignable output ports of the SONET element of FIG. 2 in accordance with one embodiment of the present invention.

FIG. 3 is a flow diagram illustrating a method of dedicating test access ports (TAPs) from otherwise assignable output ports of the SONET element of FIG. 2 in accordance with one embodiment of the present invention. The method may be accomplished using software or other programmable logic residing in the switch fabric manager 20 of the network element 10, or using other appropriate means.

Referring to FIG. 3, the method begins at step 80 wherein the switch fabric manager 20 of the SONET network element 10 determined which of the available ports are assignable as test access ports. Available ports may comprise ports not already committed for customer connections or for other uses. An available port may be assignable as a test access port if it provides suitable connectivity to the test head intended to be utilized. For example, a test head may be connectable to a digital signal (DS) line card, but not to other connections using other protocols.

At step 82, the switch fabric manager 20 selects one or a plurality of test access ports, as necessary, as test access ports. At step 84, the switch fabric manager 20 associates the test access port with a test head identifier.

At step 86, the switch fabric manager 20 dedicates the selected port or ports as test access ports. This may be accomplished utilizing logic such as that described in reference to FIG. 4, below, such that only requests associated with a test head are granted with respect to the test access ports.

Figure 4:
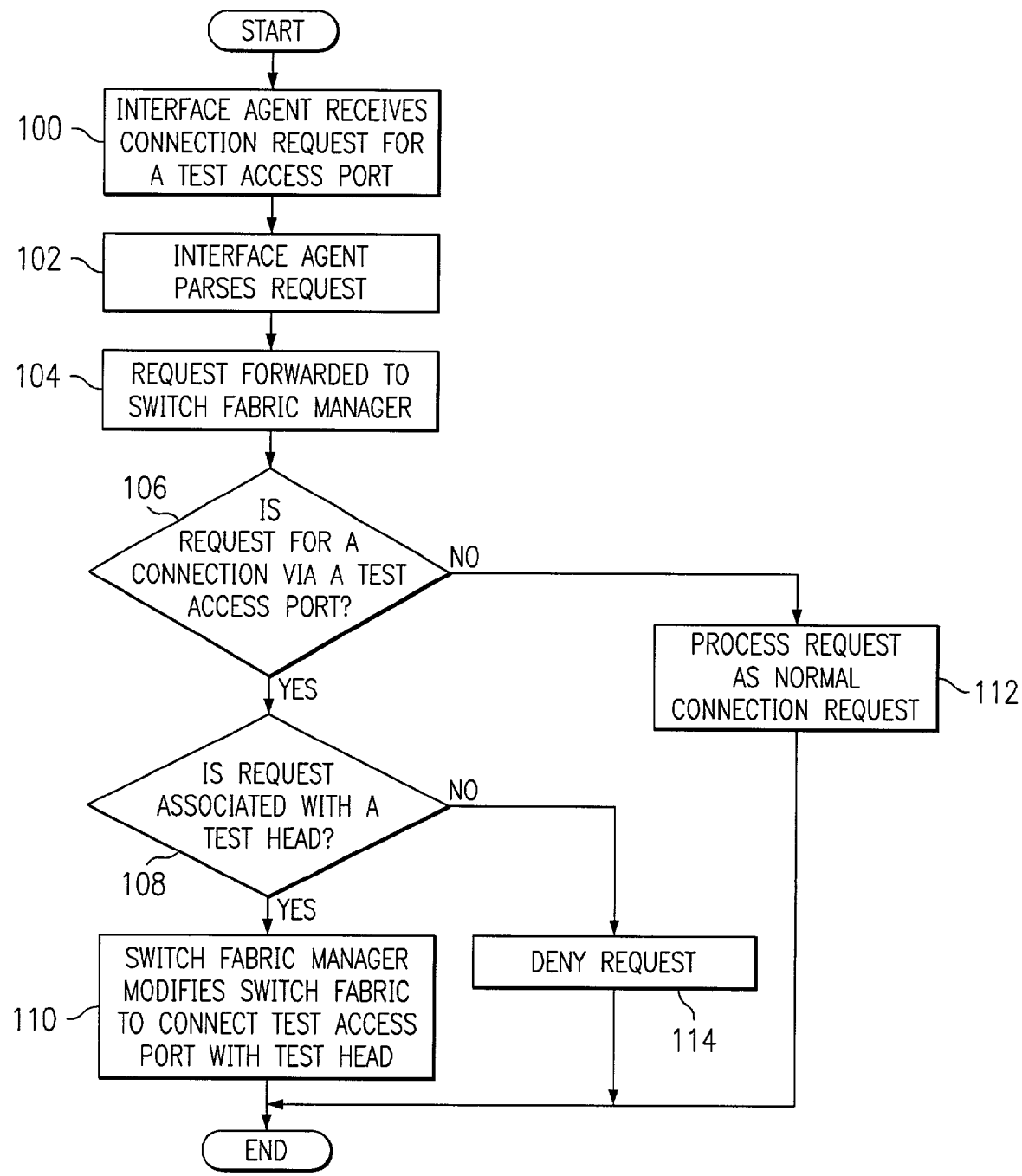
FIG. 4 is flow diagram illustrating a method of configuring and using the SONET network element of FIG. 2 to support a test head test session in accordance with one embodiment of the present invention.

FIG. 4 is flow diagram illustrating a method of configuring and using a SONET network element to support a test head test session in accordance with one embodiment of the present invention. The method may be accomplished using software or other programmable logic residing in the switch fabric manager 20 of the SONET network element 10, or using other appropriate means.

Referring to FIG. 4, the method begins at step 100 wherein the interface agent of the network element receives a connection request for a test access port. In one embodiment, the request may come directly from the test head via connection 42. The request may be in the form of a TL-1 command, or in another format or protocol. At step 102 the interface agent parses the request and forwards the relevant portion of the request to the switch fabric manager at step 104.

Proceeding to decisional step 106, the switch fabric manager determines if the request received from the interface agent is a request for a connection to a test access port. If not, then the request may proceed as a normal connection request from a customer at step 112. If the request is to test access port, the switch fabric manager at decisional step 108 determines if the request is a request associated with a test head. In this context, commands associated with a test head may comprise a command to create a connection between a DS signal under test and a test access port, a command to modify the mode of an existing connection, or a command to terminate a connection between a DS signal under test and a test access port. If the request is not a request associated with a test head, the switch fabric manager denies the request.

If the request for a connection to a test access port is associated with a test head, then the switch fabric manager processes the request at step 110 so as to modify or provision, at step 110, the switch fabric to form the connection between a DS signal under test and the test access port. In doing so, the switch fabric manager creates a physical connection through the switch fabric between the DS signal under test and the test head port such that a test session may ensue. In this context, the connection created by the switch fabric manager may comprise a single connection or a plurality of connections.

Figure 5:
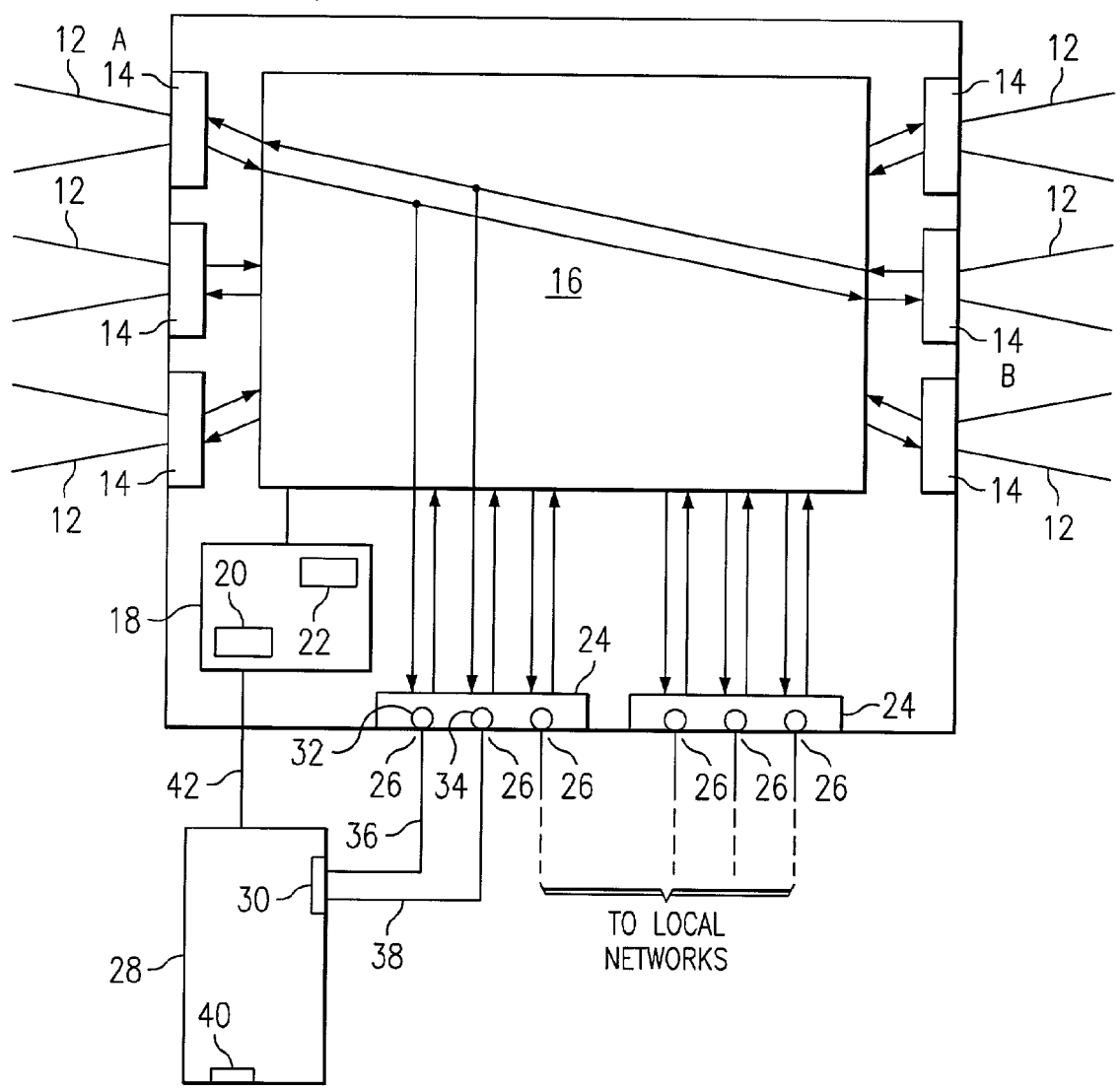
FIG. 5 illustrates the SONET element of FIG. 2 wherein the switch fabric of the SONET element is modified to support a non-intrusive test head test session.

FIG. 5 illustrates the SONET element of FIG. 2 wherein the switch fabric of the SONET element is modified to support a non-intrusive test head test session.

Referring to FIG. 5, two of the SONET line cards 14, labeled as "A" and "B," are shown in communication with one another via the switch fabric 16. In addition to being received by line card B, transmissions from line card A are passively monitored by the test head 28 via test access port 32 and connection 36. Likewise, in addition to being received by line card A, transmissions from line card B are being passively monitored by the test head 28 via test access port 34 and connection 38. In accordance with one embodiment of the present invention, such switch fabric provisioning may be created upon a command associated with the test head to form the connections, and likewise terminated upon a command associated with a test session to terminate the connection. Alternatively, the switch fabric provisioning may be modified upon a command associated with the test head to change the mode of the connections.

Figure 6:
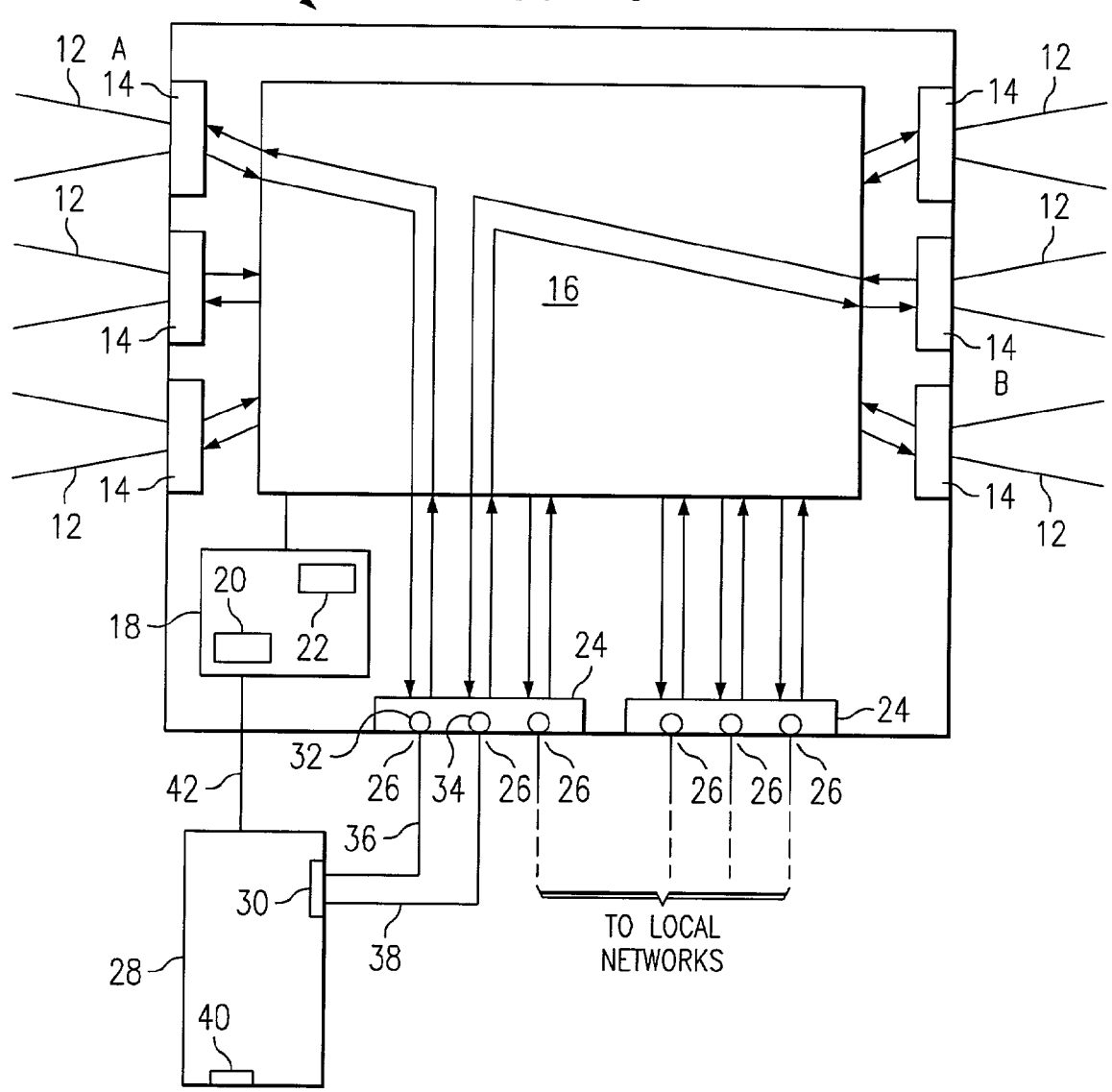
FIG. 6 illustrates the SONET element of FIG. 2 wherein the switch fabric of the SONET element is modified to support an intrusive test head test session.

FIG. 6 illustrates the SONET element of FIG. 2 wherein the switch fabric of the SONET element is modified to support an intrusive, or "split," test head test session. The "split" or intrusive monitoring mode places the test head 28 "in line" for full testing and troubleshooting of a DS loop within a SONET hierarchy or other circuit within the network 2.

Referring to FIG. 6, the connection between the two of the SONET line cards 14 labeled as "A" and "B" has been "split" by the switch fabric manager, such that transmissions from line card A are monitored by the test head 28 via test access port 32 and connection 36, transmissions from line card B are being monitored by the test head 28 via test access port 34 and connection 38. In addition, the test head may transmit signals through the SONET loops 12 connected to line cards A and B via these test access ports and test head connections. As above, and in accordance with one embodiment of the present invention, such switch fabric provisioning may be created upon a command associated with the test head to form the connections, and likewise terminated upon a command associated with a test session to terminate the connection. Alternatively, the switch fabric provisioning may be modified upon a command associated with the test head to change the mode of the connections.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for test head testing of a connection in a synchronous optical network (SONET) element, comprising:
    dedicating an otherwise assignable output port of a SONET network element as a test access port;
    receiving a request to connect a connection switched by a switch fabric of the SONET network element to the test access port;
    determining whether the request is associated with a test head; and
    if the request is associated with the test head, provisioning the switch fabric to connect the connection to the test access port and associating the test access port with a test head identifier included in the request.

2. The method of claim 1, further comprising, if the request is not associated with the test head, denying the request.

3. The method of claim 1, wherein the test head identifier comprises a TL-1 keyword value.

4. The method of claim 1, further comprising dedicating the otherwise assignable output port as the test access port using programmable logic.

5. The method of claim 1, wherein the request is a TL-1 command.

6. A system for test head testing of a connection in a synchronous optical network (SONET) element, comprising:
    means for dedicating an otherwise assignable output port of a SONET network element as a test access port;
    means for receiving a request to connect a connection switched by a switch fabric of the SONET network element to the test access port;
    means for determining whether the request is associated with a test head;
    means for, if the request is associated with the test head, provisioning the switch fabric to connect the connection to the test access port; and
    means for, if the request is associated with the test head, associating the test access port with a test head identifier included in the request.

7. The system of claim 6, further comprising means for, if the request is not associated with the test head, denying the request.

8. The system of claim 6, wherein the test head identifier comprises a TL-1 keyword value.

9. The system of claim 6, further comprising means for dedicating the otherwise assignable output port as the test access port using programmable logic.

10. The system of claim 6, wherein the request is a TL-1 command.

11. A system for test head testing of a connection in a synchronous optical network (SONET) element, comprising logic stored in computer-processable media, the logic operable to:
    dedicate an otherwise assignable output port of a SONET network element as a test access port;
    receive a request to connect a connection switched by a switch fabric of the SONET network element to the test access port;
    determine whether the request is associated with a test head; and
    if the request is associated with the test head, provision the switch fabric to connect the connection to the test access port and associate the test access port with a test head identifier included in the request.

12. The system of claim 11, further comprising logic operable to, if the request is not associated with the test head, deny the request.

13. The system of claim 11, wherein the test head identifier comprises a TL-1 keyword value.

14. The system of claim 11, further comprising logic operable to dedicate the otherwise assignable output port as the test access port using programmable logic.

15. The system of claim 11, wherein the request is a TL-1 command.

16. A SONET element, comprising:
    a switch fabric;
    a plurality of output ports connected to the switch fabric;
    logic operable to:
        dedicate an otherwise assignable output port of a SONET network element as a test access port;
        receive a request to connect a connection switched by a switch fabric of the SONET network element to the test access port;
        determine whether the request is associated with a test head; and
        if the request is associated with the test head, provision the switch fabric to connect the connection to the test access port and associate the test access port with a test head identifier included in the request.

17. A method of configuring a SONET network element to support a test head test session, comprising:
    determining which of an available plurality of output ports may be a potential dedicated test access port;
    dedicating through programmable logic one of the potential dedicated test access ports as a test access port;
    receiving a request for connection of a switch fabric to the test access port; and
    if the request is associated with a test head, provisioning the switch fabric to connect to the test access port and associating the test access port with a test head identifier included in the request.

* * * * *